Patented Aug. 7, 1928.

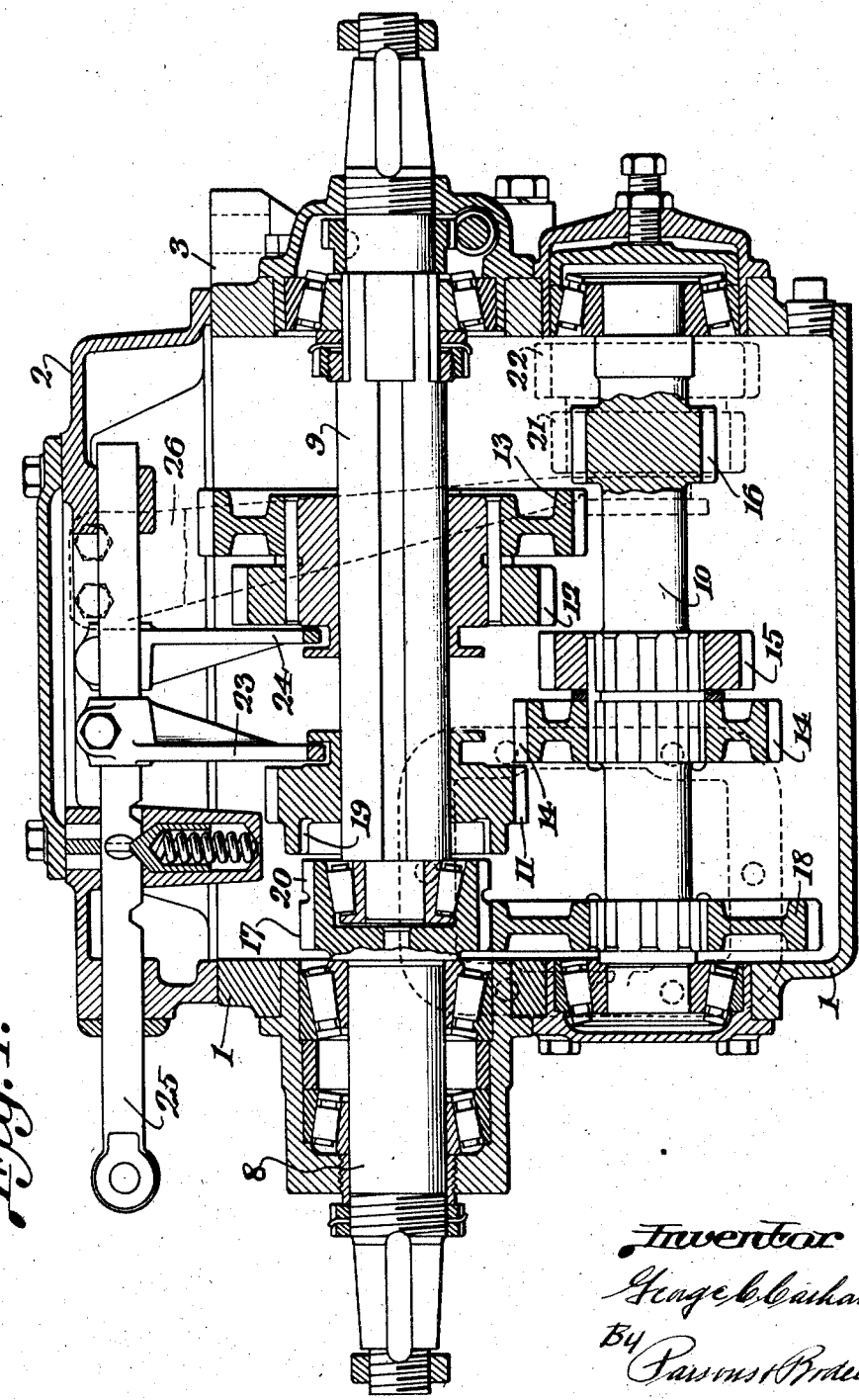

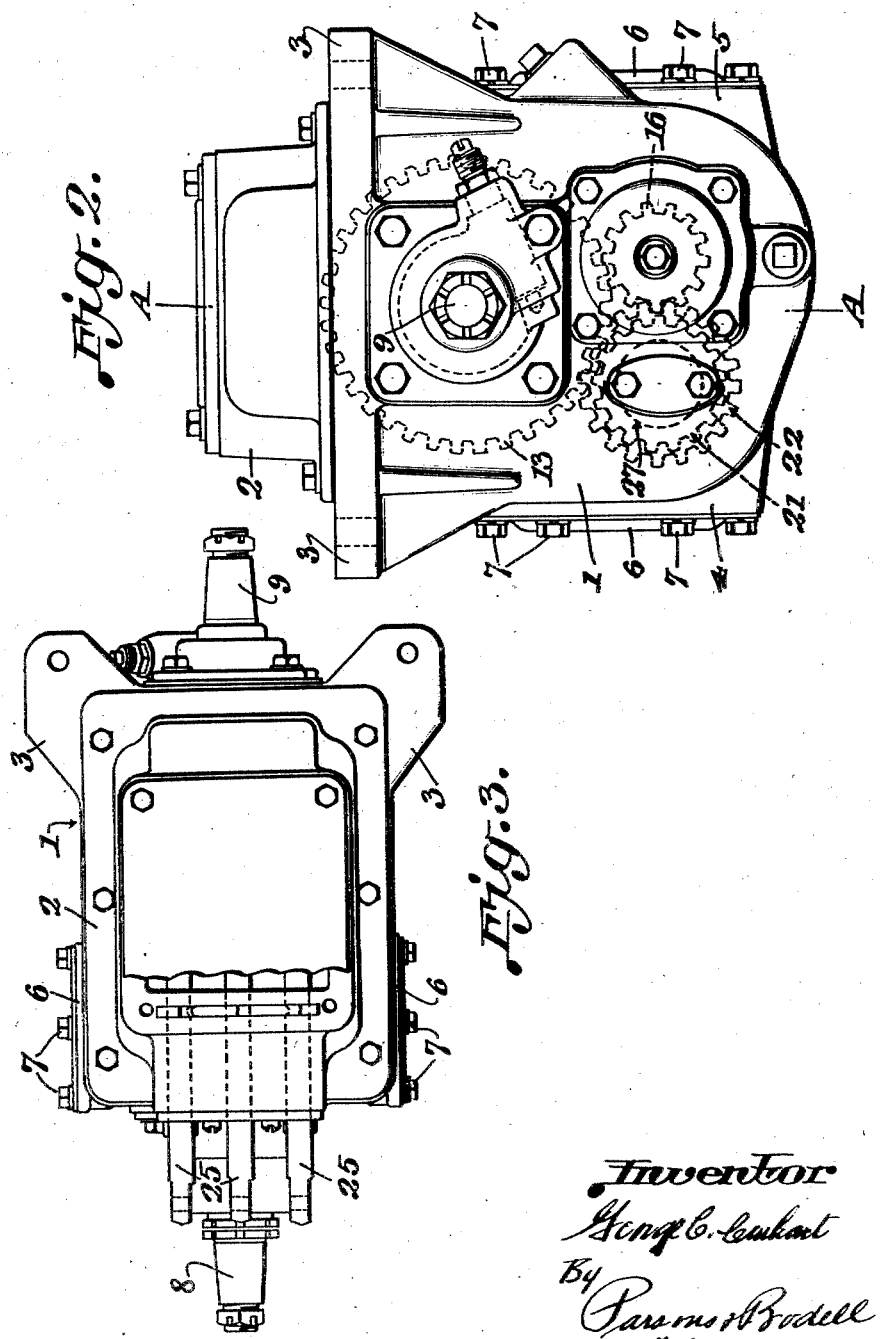

1,679,812

UNITED STATES PATENT OFFICE.

GEORGE C. CARHART, OF SYRACUSE, NEW YORK, ASSIGNOR TO BROWN-LIPE GEAR COMPANY, OF SYRACUSE, NEW YORK, A CORPORATION OF NEW YORK.

TRANSMISSION GEARING.

Application filed November 7, 1923. Serial No. 673,246.

This invention relates to transmission gearings of the type used in motor vehicles and has for its object a particularly simple and efficient arrangement of the driving, driven and countershafts and also the shaft on which the intermediary or reverse gears are mounted whereby the case is substantially symmetrical with respect to its vertical median plane and is of minimum width.

The invention consists in the novel features and in the combinations and constructions hereinafter set forth and claimed.

In describing this invention, reference is had to the accompanying drawings in which like characters designate corresponding parts in all the views.

Figure 1 is an end view of a transmission gearing embodying my invention.

Figure 2 is a vertical sectional view taken centrally on Figure 1.

Figure 3 is a plan view, partly broken away.

In a transmission gearing, such as is used in motor vehicles, such gearing having driving and driven shafts arranged in axial alinement, a countershaft and a shaft or stud on which intermediary reverse gears are mounted, the countershaft has heretofore been located directly below the driving and driven shafts and the studs on which the intermediary idlers are mounted located at one side of the vertical plane containing the axis of the alined driving and driven shafts and the countershaft, so that the side of the case on which the intermediary gear is mounted must be enlarged or projected farther laterally than the opposite side of the case.

This invention comprises an arrangement of the alined driving and driven shafts, the countershaft and the intermediary gear shaft whereby the lateral sides of the case are located substantially equidistant from the vertical, longitudinal, median plane of the case, so that the case not only is substantially symmetrical but is of minimum width and also more readily mounted in the available space therefor in the motor vehicle chassis.

1 designates the case which is in the form of a box open at its top and having a cover 2 for its open top. The box is also provided with flanges 3 by means of which the case is supported in the vehicle. The case is formed symmetrically so that its lateral sides are located at substantially equal distances from the vertical plane containing the axis of the driving and driven shafts of the gearing and is unprovided with projections on either of its sides for accommodating the idler gears used to bring about reverse motion of the driven shaft. Such sides are usually provided with openings therein which are normally covered by suitable plates 6 held in position as by screws 7. These openings are for permitting a power take off to be attached to either side of the case by removing the cover 6 and attaching such device to the case in place of the cover with the gears of the power take off device projecting through the opening in the case into position to mesh with gears within the case 1. The power take off feature forms no part of this invention.

8 and 9 are driving and driven shafts journalled in suitable bearings in the end walls in the case in axial alinement and located with their axis in such median plane A—A. 10 is a countershaft journalled in opposite end walls of the case below the alined shafts 8, 9 and offset at one side of such median plane A—A instead of in such plane. Suitable coacting gears are mounted on the shafts 8, 9 and 10 and, as the gearing here shown is of the sliding gear type, some of such gears are shiftable.

11, 12 and 13 are gears mounted on the driven shaft 9. 14, 15 and 16 are gears mounted on the countershaft 10. 17 and 18 are intermeshing gears mounted respectively on the driving shaft 8 and on the countershaft 10. The gears 12 and 13 are here shown as shiftable as a unit.

The shifting of the gear 13 to the right into mesh with the gear 16 produces first speed and the shifting of the gear 12 to the left to mesh with the gear 15 produces second speed. The shifting of the gear 11 to the right into mesh with the gear 14 produces third speed and to the left to engage the clutch faces 19, 20 on such gear 11 and on the inner end of the shaft 8, produces fourth or direct drive. To produce reverse speed, intermediary idler gears 21 and 22 are shifted to the left to mesh respectively with the gear 13 and the gear 16. The gears 11, 12 and 13 are shifted in any suitable manner as by forks 23 and 24 mounted on shifter rods, as a rod 25, slidable endwisely in suitable guides in the cover 2, these rods being connected to a shifting lever. The idler gears 21, 22 are also shifted by a suitable fork 26 actuated by a third rod similar to the rod 25.

The intermediary gears 21, 22 are mounted on a shaft or stud 27 supported by an end wall of the case toward the opposite side of the case from that toward which the countershaft is located, that is, the countershaft is offset from the median plane toward one side of the case and the shaft 27 for the intermediary idler gears is located between the offset countershaft and the side farthest from the countershaft. This offset arrangement of the countershaft and the arrangement of the shaft 27 for the intermediary idler gears relatively thereto permits the side walls of the case to be formed without lateral projections to accommodate idler reverse gears and the entire side walls to be located at substantially equal distances from a vertical plane containing the axis of the driving and driven shafts, so that the case is practically symmetrical and can be placed more readily in the available space therefor than a gearing in which the casing projects more on one side of the median plane than on the other.

What I claim is:

In a transmission gearing of the sliding gear type comprising a gear case, axially alined driving and driven shafts journalled in the end walls of the casing, a countershaft journalled in the end walls of the case and arranged below the driving and driven shafts, and intermediary gearing mounted on a stud adjacent one end wall of a case near the countershaft, and shifter mechanism supported in the case above the driving and driven shafts, the combination with such gear casing having its side walls located substantially equidistant from the vertical median plane of the case containing the axis of the driving and driven shafts, the countershaft being offset at one side of such median plane, and the intermediary gearing being mounted below the driving and driven shafts at one side of the countershaft and at the opposite side of said plane from that on which the countershaft is located whereby the side walls of the case are located equidistant from said vertical plane.

In testimony whereof, I have hereunto signed my name, at Syracuse, in the county of Onondaga, and State of New York, this 3rd day of November, 1923.

GEORGE C. CARHART.